(12) United States Patent
Laper

(10) Patent No.: US 6,505,875 B1
(45) Date of Patent: Jan. 14, 2003

(54) HINGED CONNECTOR ASSEMBLY FOR TRUCK TOPPERS

(76) Inventor: Daniel M. Laper, W7537 Dunning La., Pardeeville, WI (US) 53954

( * ) Notice: Subject to any disclaimer, the term of this patent is extended or adjusted under 35 U.S.C. 154(b) by 0 days.

(21) Appl. No.: 09/917,169

(22) Filed: Jul. 27, 2001

(51) Int. Cl.[7] .................................................. B60P 7/00
(52) U.S. Cl. ...................... 296/43; 296/164; 296/26.06; 296/100.06
(58) Field of Search ............................ 296/164, 100.02, 296/100.06, 100.07, 43, 26.06

(56) References Cited

U.S. PATENT DOCUMENTS

| | | | |
|---|---|---|---|
| 3,351,356 A | * 11/1967 | Clark et al. | 410/110 |
| 3,841,660 A | * 10/1974 | Clark | 248/231.41 |
| 4,142,760 A | * 3/1979 | Dockery et al. | 296/100.07 |
| 4,629,243 A | 12/1986 | Jensen | |
| 4,819,981 A | 4/1989 | Moe et al. | |
| 4,958,875 A | * 9/1990 | Zamzow | 248/503 |
| 5,018,777 A | 5/1991 | Swenson et al. | |
| D336,235 S | 6/1993 | Nickerson et al. | |
| 5,322,336 A | 6/1994 | Isler | |
| 5,403,061 A | 4/1995 | Micknowicz | |

* cited by examiner

Primary Examiner—D. Glenn Dayoan
Assistant Examiner—Patricia Engle

(57) ABSTRACT

A hinged connector assembly for truck toppers for allowing a truck topper to be pivotally coupled to a truck bed side wall. A hinge is mounted adjacent to each side stake hole of the truck bed side wall. Each hinge has a topper plate coupled to the topper which is pivotally coupled to a side wall plate. The side wall plates are mounted on the truck bed side wall through the side stake holes in conjunction with a respective securing plate by a threaded bolt fastening assembly. For enhancing the stability of the topper on the truck, the securing plates include a plurality of spacer tabs that are disposed within each of the side stake holes.

8 Claims, 3 Drawing Sheets

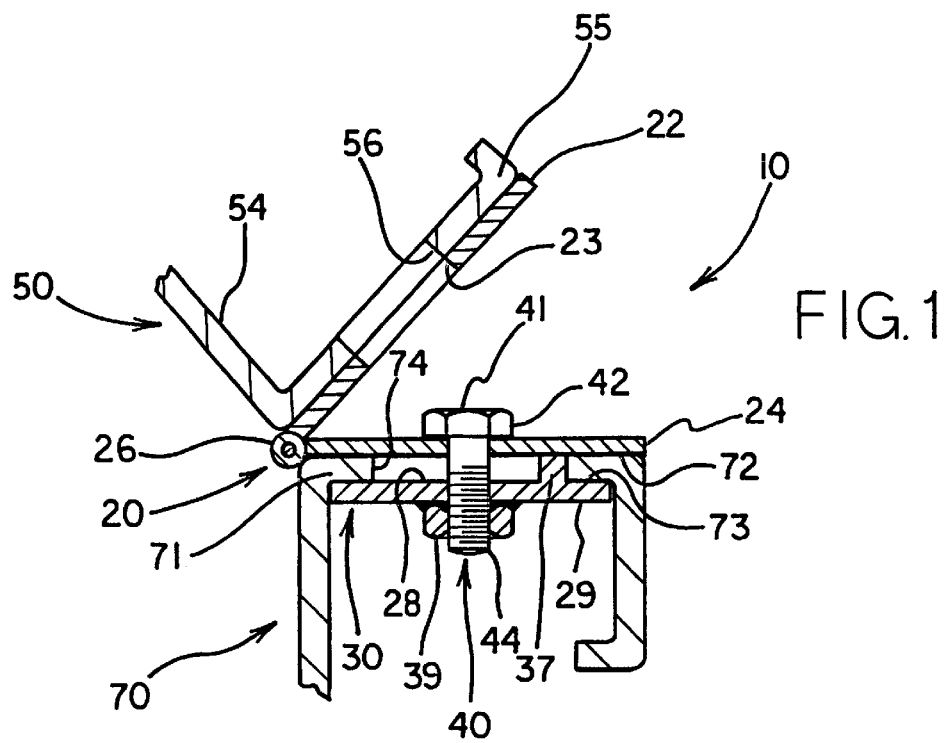
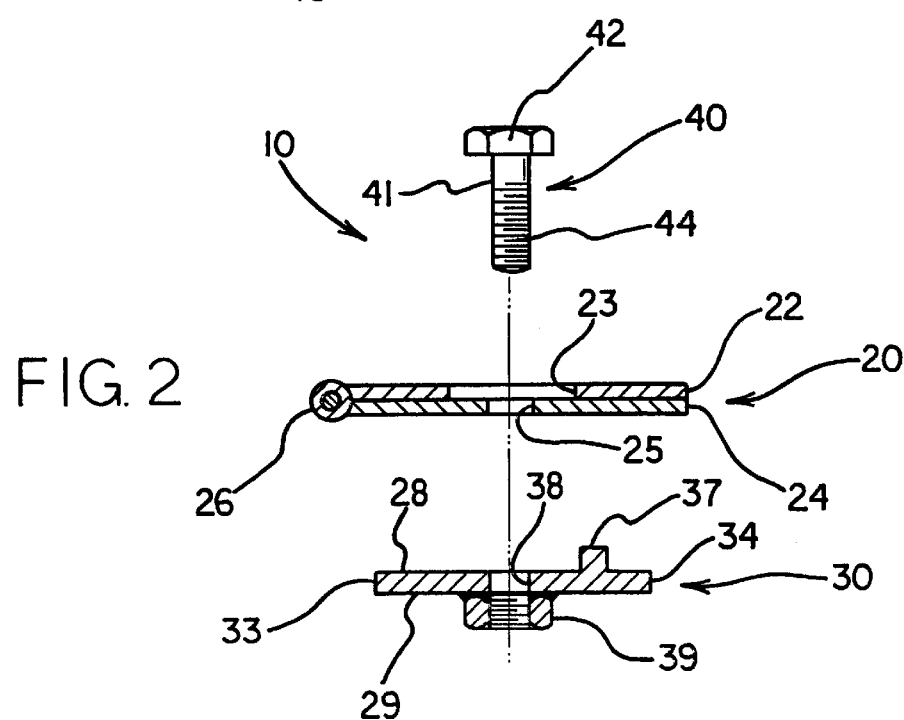

HINGED CONNECTOR ASSEMBLY FOR TRUCK TOPPERS

BACKGROUND OF THE INVENTION

1. Field of the Invention

The present invention relates to mounting devices for truck toppers and more particularly pertains to a new Hinged Connector Assembly for Truck Toppers for allowing a mounted truck topper to be raised with a stable hinged link to a truck bed side wall.

2. Description of the Prior Art

The use of mounting devices for truck toppers is known in the prior art. More specifically, mounting devices for truck toppers heretofore devised and utilized are known to consist basically of familiar, expected and obvious structural configurations, notwithstanding the myriad of designs encompassed by the crowded prior art which have been developed for the fulfillment of countless objectives and requirements.

Known prior art mounting devices for truck toppers include U.S. Pat. No. 5,322,336; U.S. Pat. No. 5,018,777; U.S. Pat. No. 4,819,981; U.S. Pat. No. 4,629,243; U.S. Pat. No. 5,403,061 and U.S. Pat. No. Des. 336,235.

While these devices fulfill their respective, particular objectives and requirements, the aforementioned patents do not disclose a new Hinged Connector Assembly for Truck Toppers. The inventive device includes a hinge positioned adjacent to each side stake pocket hole of the side wall support rail of a truck side wall on the truck bed of a truck. Each hinge has a topper plate coupled to the topper side mounting edge of a topper mounted on a truck bed, and a side wall plate mounted on the support rail top face and pivotally coupled to the topper plate. A securing plate having a securing plate front edge and a securing plate rear edge, is positioned adjacent to each of the side stake holes with each securing plate front edge and securing plate rear edge mounted to the support rail bottom face. The securing plate is secured to the side wall plate of the hinge by a threaded bolt fastening means. For enhancing the stability of the topper on the truck, a front spacer tab, a rear spacer tab, and a side spacer tab are extended from the securing plate top face and disposed within each of the side stake holes.

In these respects, the Hinged Connector Assembly for Truck Toppers according to the present invention substantially departs from the conventional concepts and designs of the prior art, and in so doing provides an apparatus primarily developed for the purpose of allowing a mounted truck topper to be raised with a stable hinged link to a truck bed side wall.

SUMMARY OF THE INVENTION

In view of the foregoing disadvantages inherent in the known types of mounting devices for truck toppers now present in the prior art, the present invention provides a new Hinged Connector Assembly for Truck Toppers construction wherein the same can be utilized for allowing a mounted truck topper to be raised with a stable hinged link to a truck bed side wall.

The general purpose of the present invention, which will be described subsequently in greater detail, is to provide a new Hinged Connector Assembly for Truck Toppers apparatus and method which has many of the advantages of the mounting devices for truck toppers mentioned heretofore and many novel features that result in a new Hinged Connector Assembly for Truck Toppers which is not anticipated, rendered obvious, suggested, or even implied by any of the prior art mounting devices for truck toppers, either alone or in any combination thereof.

To attain this, the present invention generally comprises a hinge positioned adjacent to each side stake pocket hole of the side wall support rail of a truck side wall on the truck bed of a truck. Each hinge has as a topper plate coupled to the topper side mounting edge of a topper mounted, and a side wall plate mounted on the support rail top face and pivotally coupled to the topper plate. A securing plate having a securing plate front edge and a securing plate rear edge, is positioned adjacent to each of the side stake holes with each securing plate front edge and securing plate rear edge mounted to the support rail bottom face. The securing plate is secured to the side wall plate of the hinge by a threaded bolt fastening means. For enhancing the stability of the topper on the truck, a front spacer tab, a rear spacer tab, and a side spacer tab are extended from the securing plate top face and disposed within each of the side stake holes.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new Hinged Connector Assembly for Truck Toppers apparatus and method which has many of the advantages of the mounting devices for truck toppers mentioned heretofore and many novel features that result in a new Hinged Connector Assembly for Truck Toppers which is not anticipated, rendered obvious, suggested, or even implied by any of the prior art mounting devices for truck toppers, either alone or in any combination thereof.

It is another object of the present invention to provide a new Hinged Connector Assembly for Truck Toppers which may be easily and efficiently manufactured and marketed.

It is a further object of the present invention to provide a new Hinged Connector Assembly for Truck Toppers which is of a durable and reliable construction.

An even further object of the present invention is to provide a new Hinged Connector Assembly for Truck Toppers which is susceptible of a low cost of manufacture with regard to both materials and labor, and which accordingly is then susceptible of low prices of sale to the consuming public, thereby making such Hinged Connector Assembly for Truck Toppers economically available to the buying public.

Still yet another object of the present invention is to provide a new Hinged Connector Assembly for Truck Toppers which provides in the apparatuses and methods of the prior art some of the advantages thereof, while simultaneously overcoming some of the disadvantages normally associated therewith.

Still another object of the present invention is to provide a new Hinged Connector Assembly for Truck Toppers for allowing a mounted truck topper to be raised with a stable hinged link to a truck bed side wall.

Yet another object of the present invention is to provide a new Hinged Connector Assembly for Truck Toppers which includes a hinge positioned adjacent to each side stake pocket hole of the side wall support rail of a truck side wall on the truck bed of a truck. Each hinge has a topper plate coupled to the topper side mounting edge of a topper mounted, and a side wall plate mounted on the support rail top face and pivotally coupled to the topper plate. A securing plate having a securing plate front edge and a securing plate rear edge, is positioned adjacent to each of the side stake holes with each securing plate front edge and securing plate rear edge mounted to the support rail bottom face. The securing plate is secured to the side wall plate of the hinge by a threaded bolt fastening means. For enhancing the stability of the topper on the truck, a front spacer tab, a rear spacer tab, and a side spacer tab are extended from the securing plate top face and disposed within each of the side stake holes.

Still yet another object of the present invention is to provide a new Hinged Connector Assembly for Truck Toppers that allows easy loading and unloading of the truck bed from the side of the truck rather than from the tail gate.

Even still another object of the present invention is to provide a new Hinged Connector Assembly for Truck Toppers that prevents the topper from slipping when the topper is in the pivoted open position.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a side view of a new Hinged Connector Assembly for Truck Toppers according to the present invention.

FIG. 2 is a an exploded side view illustration a new Hinged Connector Assembly for Truck Toppers.

DESCRIPTION OF THE PREFERRED EMBODIMENT

Figure 3:
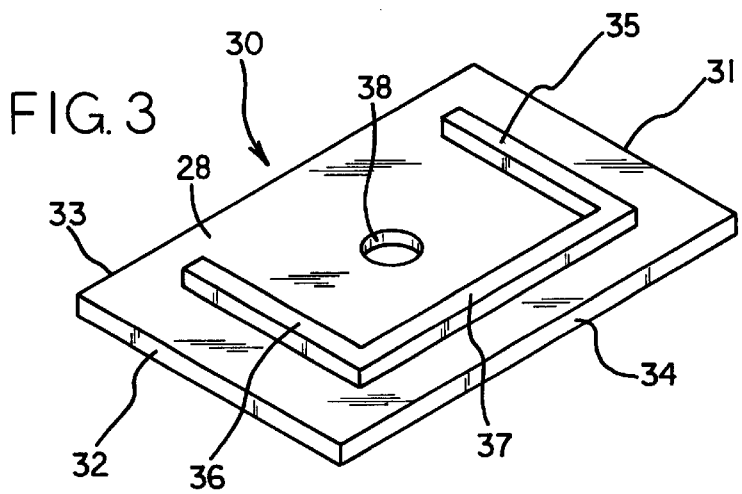
FIG. 3 is a perspective view of the securing plate.
Figure 4:
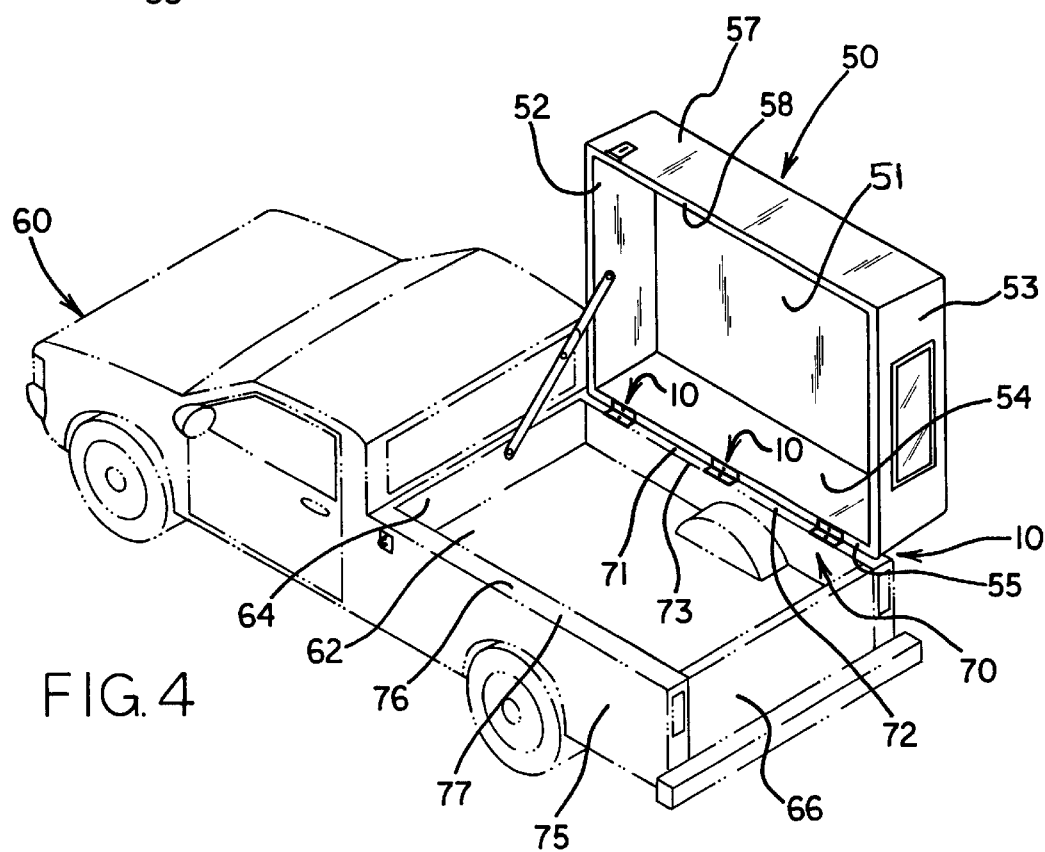
FIG. 4 is a perspective view of the invention with the topper being opened.

With reference now to the drawings, and in particular to FIGS. 1 through 5 thereof, a new Hinged Connector Assembly for Truck Toppers embodying the principles and concepts of the present invention and generally designated by the reference numeral 10 will be described.

More specifically, it will be noted that the Hinged Connector Assembly for Truck Toppers 10 comprises a securing plate mounted to the side wall support rail 71 and having a side spacer tab, a rear spacer tab and a front spacer tab, and a hinge 20 coupled to the securing plate and to the truck topper 50.

As best illustrated in FIGS. 1 through 6, it can be shown that the hinged connector assembly for truck toppers 10 is depicted on a pick-up style truck 60 with a cap or topper 50. The truck 60 has a truck bed 62 with a truck front bulk head 64, a truck tail gate 66, and a pair of truck side walls 70,75. Each truck side wall 70,75, has a side wall support rail 71,76 extending from their respective top edge. Each side wall support rail 71,76 has a support rail top face 72,77, a support rail bottom face 73,78, and a plurality of rectangular side stake pockets or holes 74 that extend from the support rail top face 72,77 to the support rail bottom face 73,78.

The topper 50 is of standard topper construction and has a ceiling portion 51, a topper front wall 52, a topper rear wall 53, and a pair of topper side walls 54, 57. Each topper side wall 54, 57 has a topper side mounting edge 55,58 extending along its bottom. Each topper side mounting edge 55,58 has a plurality of topper bolt holes 56 extending through them.

The topper 50 is mounted on to the truck 60 so that the topper side mounting edges 55,58 are positioned adjacent their respective side wall support rail 71,76. The hinged connector assembly for truck toppers 10 attaches the topper 50 to one of the side wall support rails 71,76. While the hinged connector assembly 10 is depicted mounting the topper to the passenger side, side wall support rail—so that the topper 50 can be opened from the driver's side of the truck 60, it should be understood that the hinged connector assembly for truck toppers 10 can be used on either side wall support rail.

The hinge 20 of the hinged connector assembly for truck toppers 10 has a topper plate 22 with a topper plate bolt hole 23 and a side wall plate 24 with a side wall plate bolt hole 25. The topper plate 22 and the side wall plate 24 are pivotally coupled to each other by a pivot coupling 26 so that the topper plate bolt hole 23 and side wall plate bolt hole 25 are in alignment with each other's center. A hinge 20 is positioned adjacent to each side stake pocket hole 74 so their side wall plates 24 are mounted on the support rail top face 72. The topper plate 22 of each of these hinges 20 is coupled to the topper side mounting edge 55 so that each topper plate bolt hole 23 is adjacent one of the topper bolt holes 56 on the topper mounting edge 55.

A securing plate 30 is positioned adjacent to each of the side stake holes 74 from the support rail bottom face 72. Each securing plate 30 has a securing plate front edge 31, a securing plate rear edge 32, and a pair of securing plate side edges 33,34. The securing plate front edge 31 and the securing plate rear edge 32 to be mounted to the bottom face 73 their respective sides of the side stake hole 74.

Optionally, the lengths of the securing plate side edges 33,34 can be longer than their respective side stake hole sides length 74 while the securing plate front edge 31 and the securing plate rear edge 32 are narrower than their respective side stake hole sides 74. This embodiment still allows the securing plate front edge 31 and the securing plate rear edge 32 to be mounted to the bottom face 73 while not effecting the performance of the hinged connector assembly for truck toppers 10.

On each securing plate top face 28 there is a front spacer tab 35, a rear spacer tab 36, and at least one side spacer tab 37. The front spacer tab 35, the rear spacer tab 36 and the side spacer tab 37 each extend from the securing plate top face 28 so that they are disposed within their respective side stake hole. The front spacer tab 35, the rear spacer tab 36, and the side space tab 37 are included on the securing plate top face 28 to enhance the stability of the topper 50 on the truck 60 so that topper 50 does not slide around while mounted to the truck 60. It should be noted that these spacer tabs still function properly on the optional embodiment of the invention where the lengths of the securing plate side edges 33,34 can be longer than their respective side stake hole sides length 74 while the securing plate front edge 31 and the securing plate rear edge 32 are narrower than their respective side stake hole sides 74.

A fastening means 40 couples the securing plate 30 to the side wall plate 24 of the hinge 20 to secure the hinge connector assembly for truck toppers 10 to the truck side wall 70. As shown in FIG. 1, fastening means may be a threaded bolt 41 with a head portion 42 and a threaded portion 44. The threaded portion 44 of the threaded bolt is disposed through the side wall plate bolt hole 25 and the securing plate bolt hole 38. A nut 39 located adjacent to the securing plate bottom face 29 is threaded on to the threaded portion 44 to secure the threaded bolt 41. The nut 39 may optionally be welded to the securing plate bottom face 29.

Figure 5:
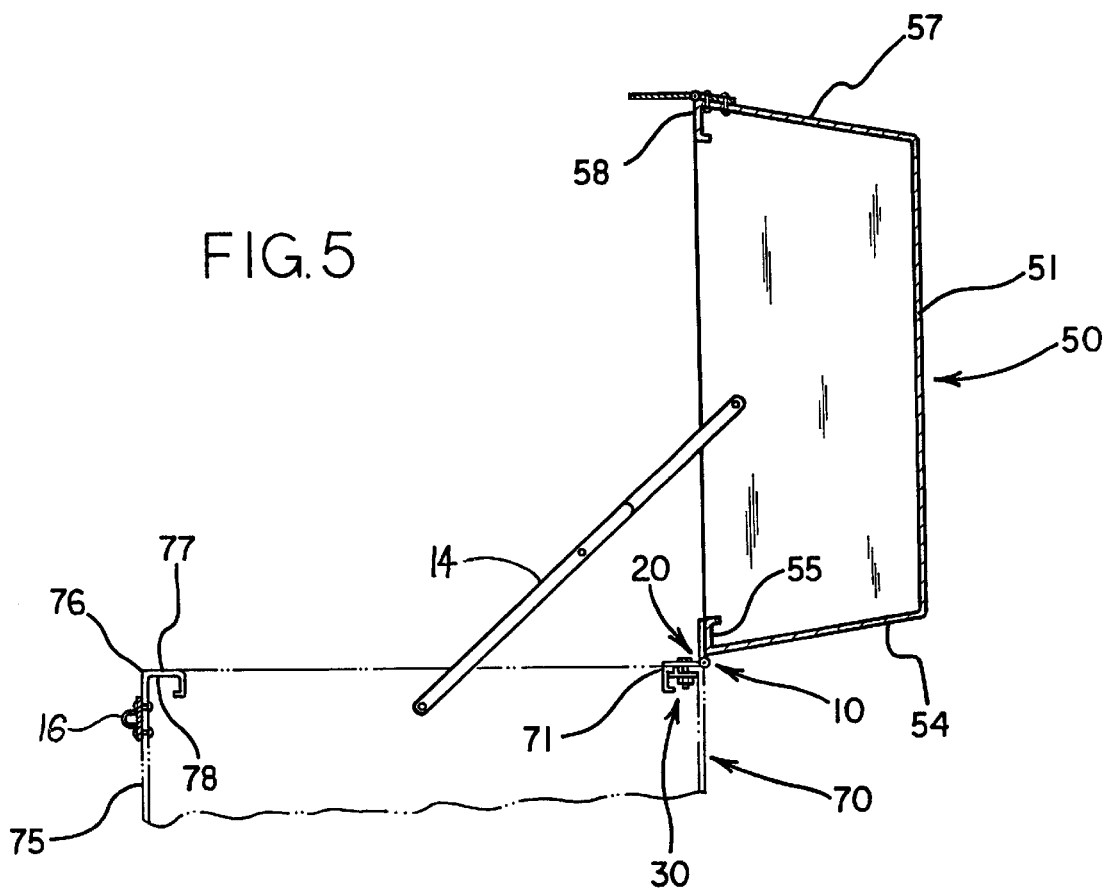
FIG. 5 is a side view of the invention with the topper being opened.

In use, the hinge connector assembly for truck toppers 10 allows the topper 50 to be pivotally lifted to an open position from a lowered closed position on the truck 60. As shown in FIG. 5, the hinge connector assembly for truck toppers 10 should allow the topper 50 to be pivoted to a ninety degree position to allow maximum access to the truck bed 62. This allows a user to load or unload the truck bed 62 from one of the truck side walls 75 rather than having to load or unload from the truck tail gate 66.

A scissors channel arm 14 with one end attached to the truck 60 and the other end attached to the topper 50 may be included to help hold the hinge connector assembly for truck toppers 10 in an open position. A locking means 16 may also be included to prevent the unauthorized opening of the topper 50.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A hinged connector system comprising:
    a truck having a truck bed, said truck bed having a side wall having a side wall support rail, said side wall support rail having a support rail top face, a support rail bottom face, and a plurality of side stake holes, each of said side stake holes extending from said support rail top face to said support rail bottom face;
    a truck topper having a topper side mounting edge, a hinged connector assembly comprising a hinge positioned adjacent to each of said side stake holes, each said hinge having a topper plate for being coupled to said topper side mounting edge, and a side wall plate being mounted on said support rail top face, said topper plate being pivotally coupled to said side wall plate; and
    a hinged connector assembly comprising:
        a securing plate for facilitating the mounting of said side wall plate of said hinge to said support rail through a respective one of said side stake holes, said securing plate being positioned adjacent to one of said side stake holes and being mounted to said support rail bottom face, said securing plate having a securing plate top face, and a securing plate bottom face, said securing plate being coupled to said side wall plate of said hinge, said securing plate having a securing plate bolt hole extending therethrough and being centrally positioned on said securing plate, said securing plate having a nut being mounted to said securing plate bottom face and being coaxially aligned with said securing plate bolt hole; and
        a spacer tab for facilitating the alignment of said securing plate with said side stake hole, said spacer tab being mounted to and extending away from said securing plate top face for being disposed within said side stake hole.

2. The hinged connector system of claim 1, wherein said side wall plate of said hinge is coupled to said securing plate by a fastening means.

3. The hinged connector system of claim 2, wherein said fastening means is a threaded bolt that is threadably couplable to said nut of said securing plate.

4. The hinged connector system of claim 1, wherein said securing plate has a securing plate front edge being mounted to said support rail bottom face, and having a securing plate rear edge being mounted to said support rail bottom face.

5. The hinged connector system of claim 1, wherein said spacer tab comprises a base leg and a pair of end legs that are attached to and extend away from said base leg in a substantially perpendicular manner such that said spacer tab is U-shaped, wherein said base leg is generally aligned with a longitudinal axis of said securing plate and is positioned proximate to a side edge of said securing plate.

6. The hinged connector system of claim 5, wherein said spacer tab is generally dimensionally smaller than each of said side stake holes to facilitate adjustment of a position of said topper with respect to said truck bed.

7. The hinged connector system of claim 1, wherein each of said side stake holes is substantially rectangular in shape.

8. A hinged connector assembly comprising:
    a securing plate for facilitating the mounting of said side wall plate of said hinge to said support rail through a respective one of said side stake holes, said securing plate having a securing plate top face, and a securing plate bottom face, said securing plate having a securing plate bolt hole extending therethrough and being centrally positioned on said securing plate, said securing plate having a nut being mounted to said securing plate bottom face and being coaxially aligned with said securing plate bolt hole; and
    a spacer tab for facilitating the alignment of said securing plate with said side stake hole, said spacer tab being mounted to and extending away from said securing plate top face for being disposed within said side stake hole;

wherein said side wall plate of said hinge is coupled to said securing plate by a fastening means;

wherein said fastening means is a threaded bolt that is threadably couplable to said nut of said securing plate;

wherein said securing plate has a securing plate front edge for being mounted to said support rail bottom face, and having a securing plate rear edge for being mounted to said support rail bottom face;

wherein said spacer tab comprises a base leg and a pair of end legs that are attached to and extend away from said base leg in a substantially perpendicular manner such that said spacer tab is U-shaped, wherein said base leg is generally aligned with a longitudinal axis of said securing plate and is positioned proximate to a side edge of said securing plate; and wherein each of said side stake holes is substantially rectangular in shape.

\* \* \* \* \*